United States Patent [19]

Opitz

[11] Patent Number: 4,594,913
[45] Date of Patent: Jun. 17, 1986

[54] DOUBLE-ACTING DIFFERENTIAL WITH SLIP LIMITING ELEMENTS

[75] Inventor: Andor Opitz, Györ, Hungary

[73] Assignee: Magyar Vagon- es Gepgyar, Györ, Hungary

[21] Appl. No.: 581,319

[22] Filed: Feb. 17, 1984

[30] Foreign Application Priority Data

Nov. 14, 1983 [HU] Hungary .............................. 3887/83

[51] Int. Cl.⁴ .............................................. F16H 1/44
[52] U.S. Cl. ...................................... 74/711; 192/48.5
[58] Field of Search ......................... 74/711; 192/48.5

[56] References Cited

U.S. PATENT DOCUMENTS

| | | |
|---|---|---|
| 3,186,258 | 6/1965 | Meldola . |
| 3,224,299 | 12/1965 | Holdeman et al. . |
| 3,264,901 | 8/1966 | Ferbitz et al. . |
| 3,331,262 | 7/1967 | Mazziotti ............................ 74/711 |
| 3,400,611 | 9/1968 | Engle . |
| 3,404,585 | 10/1968 | Roper ................................... 74/711 |
| 3,448,635 | 6/1969 | Nelson . |
| 3,815,442 | 6/1974 | McAninch et al. ................... 74/711 |
| 3,896,684 | 7/1975 | Duer . |

Primary Examiner—A. Michael Chambers
Assistant Examiner—John C. Fox

[57] ABSTRACT

A double-acting differential having a differential case held together by coupling elements, a drive gear fixed to the case and within the case, output shafts, side gears, differential pinions, and a spider. It also has internally splined disks connected to the side gear, and externally splined disks connected to the case, and pressure springs arranged between the differential case and one of the side gears. A thrust plate is movable in axial direction and receives from one direction the axial force from the side gear and from the other side, through the splined disks, the reaction forces of the pressure springs. A lock ring limits axial movement of the thrust plate in case of a small torque, and a flange in the wall of the differential case supporting the splined disks, in case of a large torque. Between the side gear and the internally splined disk there may be a hub suitable for torque transmission and to be coupled between engaged and disengaged positions, and to which a sliding clutch sleeve may be connected by a shift fork.

2 Claims, 3 Drawing Figures

DOUBLE-ACTING DIFFERENTIAL WITH SLIP LIMITING ELEMENTS

The invention relates to double-acting differentials with slip limiting elements for motor vehicles.

The generally known differentials of motor vehicles as a system of two degrees of freedom—apart from driving of the wheel—allow the turn of the vehicle wheels at different speed in a curve, and distribute the torque uniformly even when it is unfavourable for the travelling of the motor vehicle.

Such is the case when one of the wheels turns over on a muddy or icy ground, and therefore the torque available for the wheel gripping well the ground is the same as that on the slipping wheel, which is insufficient for the vehicle to continue to advance.

In order to reduce or eliminate this adverse effect of the conventional differentials there are known several partially locking differentials, and those provided with slip limiting elements. Their common characteristic is that the internal resistance (friction) is artificially increased. The increased internal frictions upset the balance of the torque in case of differentiation of the wheels and depending on the extent of the frictional force increase the torque on the well gripping wheel and reduce it on the slipping wheel.

The common characteristic of the differentials provided with slip limiting elements is that until the difference in output torque between the two driving shafts reaches the value determined by the internal friction, there is no relative angular displacement between the driving shafts or wheels.

The frictional torque is produced in every case by a clutch of multiple disk or conical type. Two basic alternatives are possible in respect of the compressive force acting on the multiple disks:

(a) The compressive force is constant. This can be suitably ensured with springs.

(b) The compressive force is varying in proportion to the driving torque. In this case the reaction forces arising during operation of the differential are utilized.

A spring force-operated friction clutch is shown in the U.S. Pat. No. 3,448,635. The drawback of this construction is that the slip-torque is unnecessarily high even in case of low driving torque.

This is apparent especially when the vehicle travels under light load or without load, thus the internal frictional torque is unnecessarily high between the wheels of the vehicle, which detrimentally affects the travel in a curve.

Attempts were made to eliminate this detrimental effect by producing a mechanism which can be disengaged. However this is not satisfactory, since the driver of the vehicle does not sense either the unnecessarily too high internal frictional torque arising during the operation, or the extent of the excessive wear of the disks and tires. In addition, since the tractive effort requirement is minimum, thus not even the less dynamic behaviour of the vehicle will be a warning sign for the driver.

A further drawback of the solution described in the U.S. Pat. No. 3,448,635 also showing such an arrangement is that since the friction clutch is arranged outside the differential casing, the heat dissipation is complicated and it is solved only with the admission of the lubricating oil along long passages.

The drawback of an other known solution—referred to under item (b) hereinabove—and which utilizes the reaction forces of one of the elements of the differencial for increasing the internal frictional torque of the clutch is that if the torque being exerted on the driving shafts is low, e.g. when the afore-mentioned wheel stands on ice, the low frictional torque arising on the other wheel due to the low tractive effort is insufficient for the progress of the vehicle.

Since both solutions have serious disadvantages, consequently the correct solution can be arrived at only with a double-acting mechanism in which both the spring force and the reaction force are utilized.

Although such double-acting mechanisms have been produced where a spring is arranged between the differential side gears (e.g. U.S. Pat. Nos. 3,224,299 and 3,400,611 (Borg Warner) and U.S. Pat. No. 3,186,258 (Chrysler) and U.S. Pat. No. 3,896,684 (General Motors Corp.) however these are characterized in that the spring (or springs) are arranged between the differential side gears, thus they can be used only when the differential has two small differential pinions, and because of the narrow space only weak springs can be arranged, which are incapable of ensuring the required effect.

The invention is aimed at implementing a solution which eliminates the adverse properties of the mechanisms known at present and produces such internal frictional conditions by combining in the differential the spring force and the reaction force arising on one of the elements of the differential which will result in an alteration of the internal resistance, thus assuring an optimum tractive effort—specified in respect of the wheel and the ground—between the driven wheels under extensive operating conditions of the vehicle.

This is achieved by a double-acting differential with slip-limiting elements, which comprises two halves of differential case held together with coupling elements, a drive gear fixed to the case, conventional differential elements arranged within the case, such as output shafts, side gears, differential pinions, a spider, as well as new elements such as a thrust plate, internally splined disks, externally splined disks, pressure springs arranged in an inner space between the differential case and one of the side gears, and the externally splined disks are connected to the case and the internally splined disks are connected in a manner suitable for torque transmission to the side gear, further comprising a thrust plate movable in axial direction receiving from one direction the axial force arising on the side gear and from the other side—through the splined disks—the reaction forces of the pressure springs, and a lock ring limiting in case of small torque the axial movement of the thrust plate and a flange machined in the wall of the differential case supporting the splined disks in case of a great driving torque.

Advantageously between the side gear and and the internally splined disk a hub suitable for torque transmission and suitable for being coupled in both senses between engaged and disengaged positions according to the operation conditions is arranged, to which hub a sliding clutch sleeve sliding on the splining of the differential shaft can be connected suitable for torque transmission by means of a shift fork.

In a further embodiment of the invention a shoulder is machined in the differential case to limit the detrimental axial displacement of the side gear in case of breakdown of the disks and provide seating for the thrust plate.

The invention is shown by way of examples only in the following figures in which.

Figure 3:
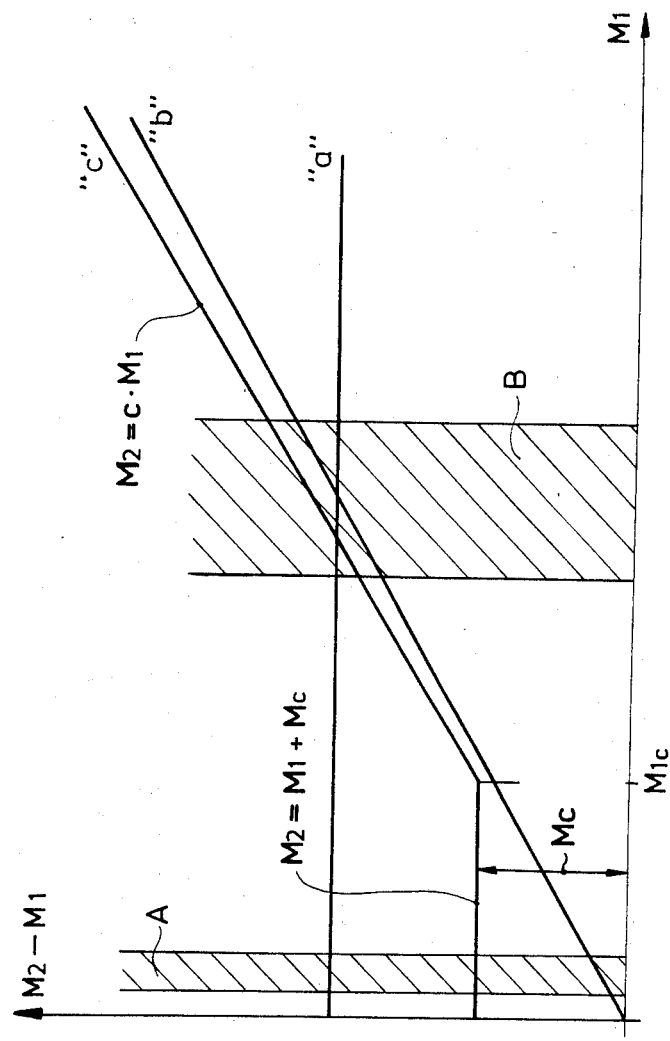

In FIG. 3 torque-curves are represented.

Figure 1:
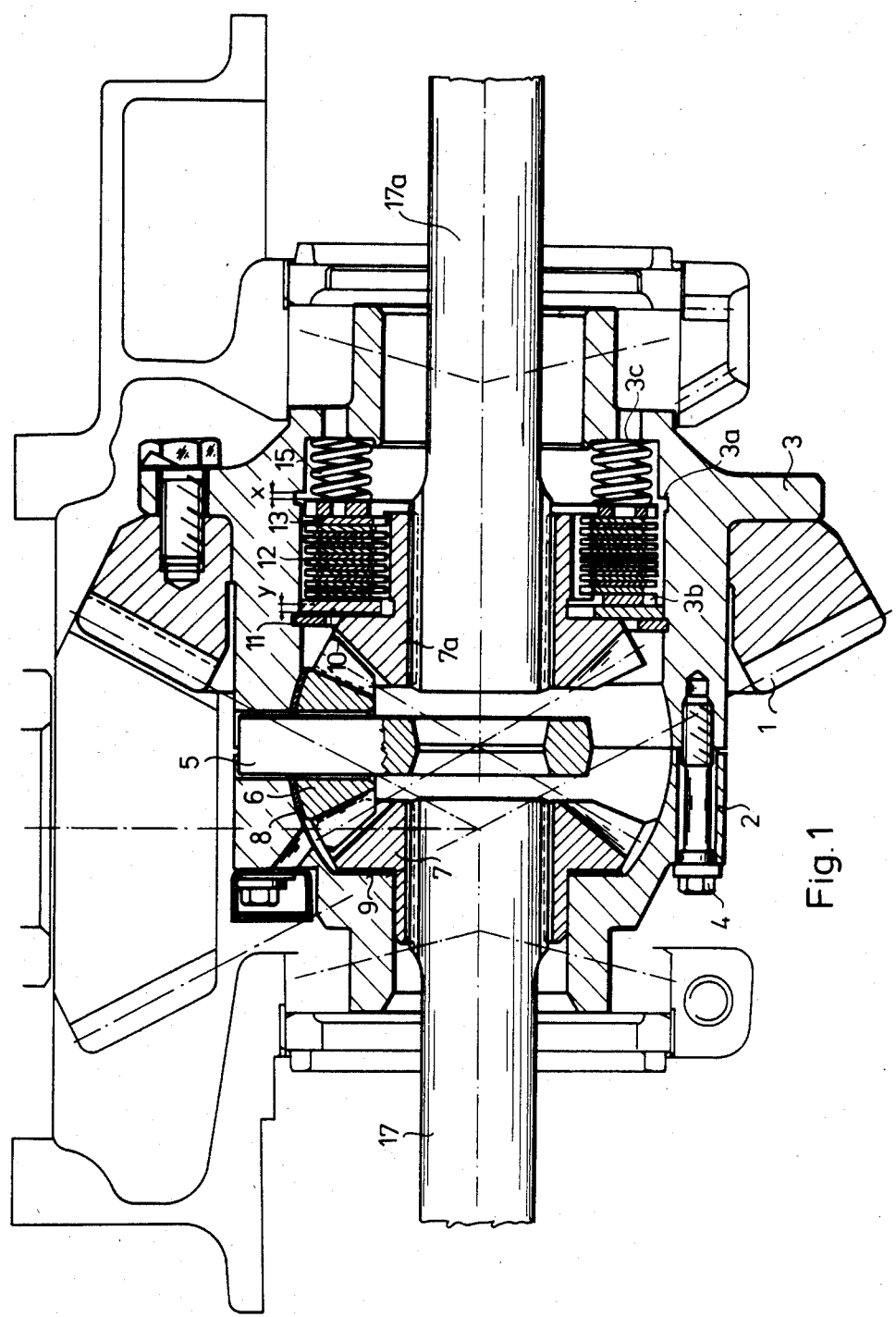
FIG. 1 is a cross sectional view of the double-acting differential with slip limiting elements.

In FIG. 1 a suitable construction of the invention is shown which consists of two halves 2, 3 of a differential case held together with bolts 4, provided suitably with bearings at both ends. The drive gear 1 is fixed to one of the two halves 2, 3 of the differential case forming a single piece. The differential case includes the elements of a conventional differential, such as the output shafts 17, 17a, a spider 5, differential pinions 6 and side gears 7, 7a, and their thrust washers 8 and 9 as required. Between one side gear, in this case the side gear 7a, and the wall 3c of the differential case half 3 pressure springs 15, externally splined disks 12 and internally splined disks 13, a thrust plate 10 and a lock ring 11 are arranged. The pressure springs 15 bear against the wall 3c and against the disks 13. The disks 13 rest on the thrust plate 10 which bears against the side gear 7a. The thrust plate 10 can move in both directions and take up from one direction the axial force of the side gear 7a and from the other direction, through the disks 12 and 13, the reaction forces of the pressure springs 15. The movement of the thrust plate 10 towards the center of the differential is limited by the lock ring 11 fitted into the differential case half 3. The externally splined disks 12 and the internally splined disks 13 are arranged between the thrust plate 10 and a flange 3a machined for this purpose in the differential case half 3. The externally splined disks 12 are connected to the differential case half 3 and the internally splined disks 13 in a manner suitable for torque transmission to the differential side gear 7a. The disks 12, 13 are pressed against the thrust plate 10 by pressure springs 15 supported by the wall of the differential case half 3.

Advantageously a shoulder 3b is formed on the differential case to limit the axial displacement of the thrust plate 10, which prevents the excessive movement of the differential side gear 7a exceeding a certain limit in case of breakdown of the disks. The shoulder 3b is formed from the point of view of the gearing in a suitable distance from the thrust plate 10 on the side of the splining.

The mechanism can be engaged or disengaged depending on the operating conditions.

Figure 2:
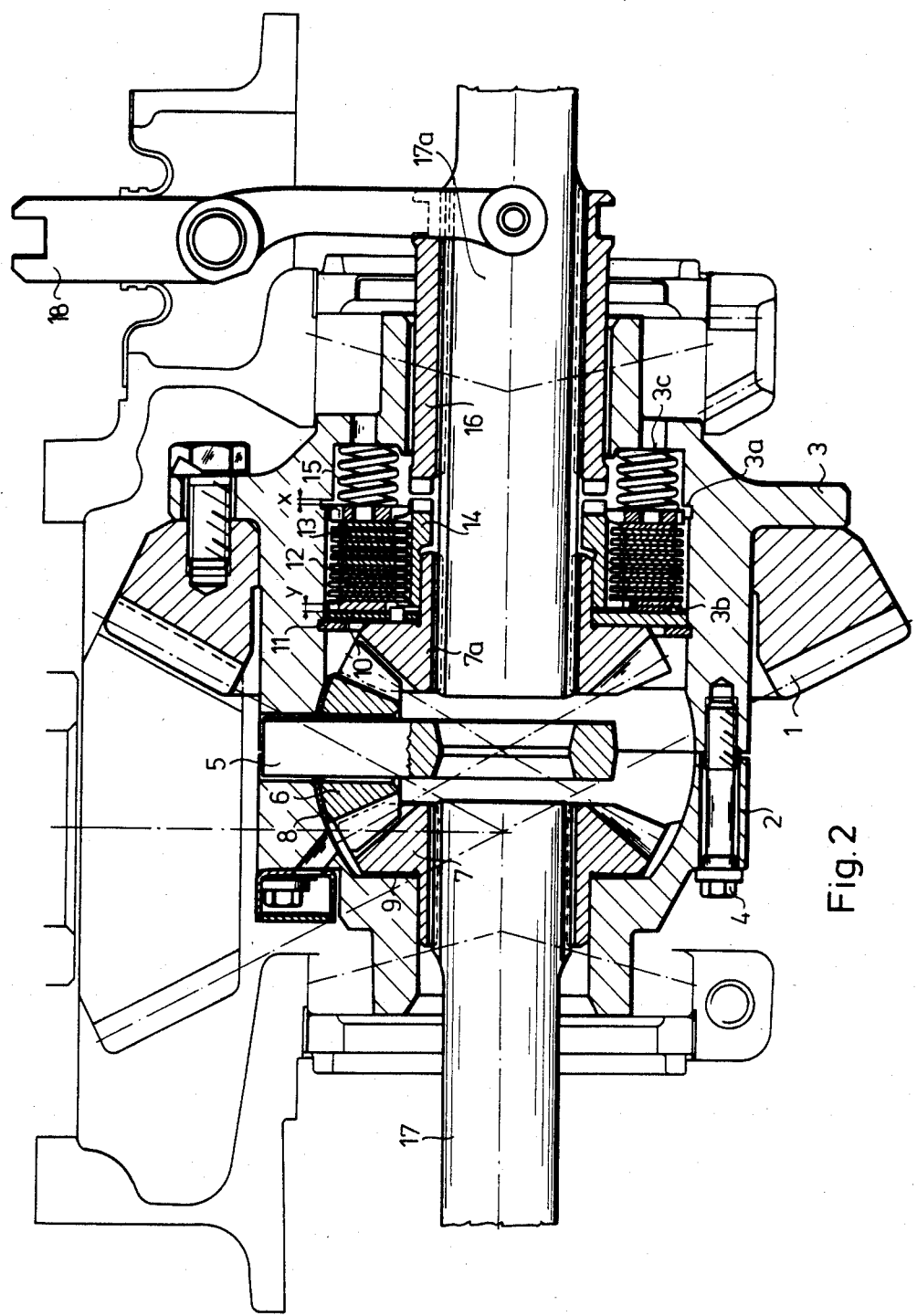
FIG. 2 is a cross sectional view of the double-acting differential with disengageable slip limiting elements.

The construction according to FIG. 2 shows a double-acting engageable differential with slip limiting elements, where the internally splined disks 13 are not connected to the side gear 7a but to a hub 14 in a way suitable for torque transmission. A sliding clutch sleeve 16 is connected through existing splining to an output shaft 17a on the side of the disks 12, 13 which can be axially moved with a shift fork 18 in engaged and disengaged condition. In engaged condition the sliding clutch sleeve 16 is engaged with the hub 14 in a way suitable for torque transmission. In disengaged condition this coupling is interrupted. In engaged condition the power train is closed in the following sequence: differential case half 3, externally splined disk 12, internally splined disk 13, hub 14, sliding clutch sleeve 16, output shaft 17a, differential side gear 7a, differential pinion 6, spider 5.

The operation of the double-acting differential with slip limiting elements according to the invention is the following: The differential functions without a normal differential locking device in so far as the hub 14 and the sliding clutch sleeve 16 are not in a positive engagement.

The operation mode in case of a positive engagement: when the axial force produced by the teeth of the differential gears acting on the differential side gears 7a is smaller than the resulting force of the spring pack of the pressure springs 15, the thrust plate 10 rests on the lock ring 11 fitted into the differential case half 3. In this operation mode the torque between the output shafts 17, 17a and the wheels of the vehicle is constant with its extent being dependent upon the selection of the compressive force of the pressure springs 15.

The output torque is $M_2 = M_1 + M_c$.

$M_1$ is the torque of the wheel being on the side of the vehicle where the gripping coefficient is smaller;

$M_2$ is the torque of the wheel being on the side of the vehicle where the gripping coefficient is greater;

$M_c$ is the frictional torque of the clutch depending on the thrust force of the pressure springs.

When the extent of the axial force acting on the differential side gear 7a exceeds the resulting force of the spring pack of the pressure springs 15, the differential side gear 7a pushes the thrust plate 10 towards the disks 12, 13 until they bear against the flange 3a of the differential case half 3 formed for this purpose. The disks 12, 13 and the thrust plate 10 move along a distance "X" in axial direction. In this operation mode the internal resistance increases or diminishes in proportion to the load. The detrimental axial displacement at the side gear 7a in sense outward of the center of the differential is prevented by the shoulder 3b by limiting it to a distance "Y". The Y>X condition has to be fulfilled for the correct operation of the mechanism.

The output torque is $M_2 = cM_1$

In FIG. 3 torque-curves are represented. Curve a represents a differential provided with frictional clutch working with constant compressive force. Curve b represents a differential provided with a frictional clutch operating with a reaction force varying in proportion to the driving torque. Curve c represents the differential according to the invention. As it can be seen from the diagram when the constructions known are dimensioned for an optimum operation under heavy working conditions designated with field B in the diagram, then they can not work with optimum efficiency under light working conditions shown in field A in the diagram. In contrary to the known devices the mechanism according to the invention operates favorably in case of light and heavy working conditions alike, since in case of light load the compressive force acting on the disks is ensured first by the springs, then after a specific torque of load by the reaction force of the differential side gears. This way the travel of the vehicle is ensured even under the most severe conditions. The advantage of the differential assemblies according to the present invention over other differential assemblies with slip limiting elements is that it does not reduce in low load ranges the riding capability of the vehicle (e.g. in bends), furthermore, that it causes no unnecessarily too high wear on the tires or heat generation of excessive degree in the differential assembly.

A further advantage is that the mechanism according to the invention can be produced with engaging and disengaging devices operated pneumatically, hydraulically or electrically by the driver from the driving compartment. Thus the differential can be used even under diversified operating conditions.

Although the mechanism according to the invention fulfils many functional roles, it still does not require large space and as a consequence it can be installed into any existing mechanism subsequently. The small space requirement is due to the fact that the differential case consists only of two half parts, although—even in case of limited functional tasks—the differentials currently used consist in general of three or four parts.

What I claim is:

1. A double acting differential gear having slip-limiting means, comprising: a differential case having an internal spherical wall and two differential case halves having a common axis of rotation, coupling elements holding said halves together, one case half having a flange, driving gear means fixed to said one, flanged differential case half, a differential cross between said two case halves, differential pinions rotatably mounted in said differential cross, a spherical thrust plate inhibiting axial displacement of said differential pinions and bearing against said internal spherical wall of said differential case, two differential side gears arranged at the axis of rotation of said differential case and engaged with teeth of said differential pinions, said side gears having internal ribs engaged with external ribs of two driving shafts for torque transmission, one of said side gears having a rear side bearing against the inner wall of said differential case half through a thrust plate for the axial support of said side gear, said other differential side gear being arranged in said flanged differential case and having a rear side supported by an axially movable thrust plate, externally and internally ribbed discs arranged between said thrust plate and said flange, said externally ribbed discs being engaged with internal ribs of said flanged differential case half for torque transmission, said internally ribbed discs being engaged with the external ribs of said side gear for torque transmission, pressure springs arranged between said discs and said flange and pressing said discs against said thrust plate, the arrangement being such that, when the force of said pressure springs is greater than the axial force reacting on said side gear, said pressure springs press said thrust plate through said discs against a snap ring in a groove of said flanged differential case half, to thereby ensure tooth clearance between the teeth of said side gear; and when the force of said pressure springs is less than the axial force reacting to said side gear, said side gear presses the discs through said thrust plate against said flange; and a shoulder at a front of said internal ribs of said flanged differential case, said shoulder in case of failure of said discs preventing the thrust plate from axial displacement to an extent which would result in increased, harmful tooth clearance in said side gears.

2. A double acting differential gear having slip-limiting means comprising: a differential case having an internal spherical wall and two differential case halves having a common axis of rotation, coupling elements holding said halves together, one case half having a flange, driving gear means fixed to said one, flanged differential case half, a differential cross between said two case halves, differential pinions rotatably mounted in said differential cross, a spherical thrust plate inhibiting axial displacement of said differential pinions and bearing against said internal spherical wall of said differential case, two differential side gears arranged at the axis of rotation of said differential case and engaged with teeth of said differential pinions, said side gears having internal ribs engaged with external ribs of two driving shafts for torque transmission, one of said side gears having a rear side bearing against the inner wall of said differential case half through a thrust plate for the axial support of said side gear, said other differential side gear being arranged in said flanged differential case and having a rear side supported by an axially movable thrust plate, externally and internally ribbed discs arranged between said thrust plate and said flange, said externally ribbed discs being engaged with internal ribs of said flanged differential case half for torque transmission, said internally ribbed discs being engaged with external ribs of a hub for torque transmission, said hub being rotatably mounted in an external jacket of said side gear, pressure springs arranged between said discs and said flange and pressing said discs against said thrust plate, the arrangement being such that, when the force of said pressure springs is greater than the axial force reacting on said side gear, said pressure springs press said thrust plate through said discs against a snap ring in a groove of said flanged differential case half, to thereby ensure tooth clearance between the teeth of said side gear; and when the force of said pressure springs is less than the axial force reacting to said side gear, said side gear presses the discs through said thrust plate against said flange; and a shoulder at a front of said internal ribs of said flanged differential case, said shoulder in case of failure of said discs preventing the thrust plate from axial displacement to an extent which would result in increased, harmful tooth clearance in said side gears, said hub having a front surface with coupling claws, a sliding coupling hub having further claws engaged with said coupling claws and also having internal ribs, and an axially slidable coupling fork for engaging said internal ribs of said sliding hub with external ribs of the differential shaft for torque transmission, whereby the slip-limiting means can be engaged or disengaged depending on running conditions.

* * * * *